(12) United States Patent
Engels et al.

(10) Patent No.: US 6,649,197 B2
(45) Date of Patent: *Nov. 18, 2003

(54) DRY BAKERY PRODUCTS AND A PROCESS FOR THEIR PREPARATION

(75) Inventors: Aaldrik Engels, Aalsmeer (NL); Everwien ter Haseborg, Huizen (NL); Martin Hoogland, Laren (NL)

(73) Assignee: Quest International B.V., Naarden (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 day.

(21) Appl. No.: 08/836,650
(22) PCT Filed: Nov. 6, 1995
(86) PCT No.: PCT/EP95/04340
§ 371 (c)(1), (2), (4) Date: May 8, 1997
(87) PCT Pub. No.: WO96/13981
PCT Pub. Date: May 17, 1996

(65) Prior Publication Data
US 2002/0004084 A1 Jan. 10, 2002

(30) Foreign Application Priority Data
Nov. 8, 1994 (EP) .............................. 94203253

(51) Int. Cl.⁷ .................................. A21D 8/02
(52) U.S. Cl. ............................ 426/18; 426/20; 426/28; 426/61; 426/62; 426/94
(58) Field of Search .................... 426/20, 18, 52, 426/61, 28, 549, 94, 62

(56) References Cited

FOREIGN PATENT DOCUMENTS

| DE | 39 05 055 | 8/1990 |
|---|---|---|
| EP | 153 057 | 8/1985 |
| GB | 980 384 | 1/1965 |
| GB | 1 539 756 | 1/1979 |
| WO | 95/13706 | 5/1995 |

OTHER PUBLICATIONS

Encyclopedia of Chemical Technology, p. 882, 1992.*
" The Wellness Encyclopedia of Food and Nutrition", p. 321, 1992.*
" The Wholefood Catalog", p. 30, 1988.*
" The Fannie Farmer Cookbook ", p. 516, 1979.*
" The Baking Science & Technology", pp. 1022–1023, 1988.*

* cited by examiner

Primary Examiner—Lien Tran

(57) ABSTRACT

Dough useful for the preparation of dry bakery products, particulary crackers, is prepared by the addition to the dough of a bakery ingredient prepared by fermentation of cereal germs with lactic acid producing bacteria. The fermentation is preferably carried out with Lactobacilli, such as *Lactobacillus plantarum*. During the fermentation yeast and/or enzymes such as proteases and carbohydrases may be added to the fermentation mixture. After fermentation, the mixture is preferably concentrated or converted into a dry product which can be easily shipped, stored and handled. The bakery ingredient leads to a simplified and shorter process for preparing dry cereal products and improved product properties. For cracker manufacture, the traditional sponge step can be omitted.

13 Claims, 3 Drawing Sheets

DRY BAKERY PRODUCTS AND A PROCESS FOR THEIR PREPARATION

This application is the national phase of international application PCT/EP95/04340 filed Nov. 6, 1995 which was designated the U.S.

BACKGROUND OF THE INVENTION

1. Field of the Invention

The present invention relates to dry bakery product, a process for preparing them and a novel bakery ingredient employed in that preparation. more particularly the invention is concerned with crackers and a process for their preparation.

2. Description of Related Art

Conventionally, so-called premium crackers (also known as cream crackers or fermented crackers) are generally manufactured by preparing a mixture of flour, water, yeast and sugar, followed by a conventional sponge fermentation involving low speed mixing of dough ingredients (flour, water, yeast and often salt) on a dough mixer for 20–25 minutes or using a combination of low and high speed mixing. The mixture is fermented in bulk for the time stated in the recipe, commonly 18–24 hours (sponge fermentation). During this fermentation the yeast ferments out the sugars while the lactic acid bacteria that are always present in commercial yeast products assimilate some of the products of yeast and lactic acid bacteria. The mixture provides components that contribute to taste, texture and appeal of premium crackers. Such a mixture is then added to the rest of the ingredients which make up the premium cracker dough and processing proceeds in a conventional way.

On a laboratory scale two main conventional ways of processing can be distinguished: classical premium cracker manufacture and starter culture based premium cracker manufacture, see R. C. Hoseney and various collaborators in Cereal Chemistry, 57(3) 185–8 1980, 57(4) 249–52 1980, 62(3) 158–62 1985, 66(1) 7–10 1989. Both involve the preparation of a pre-fermentation slurry from flour and water, fermented with a lactobacilli containing yeast or with yeast and a separately added lactobacilli starter culture. This prefermented slurry is then added to the sponge fermentation mixture and the sponge fermentation step is performed which typically takes 18 hours at 30° C. In practice, these prefermentation steps are not carried out but a sponge fermentation is done as the first step. It is followed by the dough fermentation step which takes typically 4 hours at 30° C. Dough handling is completed in the usual way by rolling, laminating and cutting. Total production time before baking is generally well over 20 hours. This is schematically set out in FIG. 1.

The process can be shortened by using the continuous or semi-continuous pre-culture process involving a yeast based fermentation and a lactic acid based fermentation. Quantities of these fermentation broths are then added to the final dough mixture as required. This process is used in industry and is schematically set out in FIG. 2. A problem likely to occur with this approach is the difficulty of maintaining adequate process control so as to ensure a consistent addition of the fermented ingredients to the main dough ingredients. An incorrectly matured fermented ingredient will produce a substandard final product. The pre-fermentation procedures can reduce the manufacturing time per batch to a few hours. However, the pre-fermentation processes require continuous maintenance. The fermentations periodically require to be re-set with resulting considerable production inconvenience. Additionally, the total number of processing steps is not greatly reduced. In EP-B-0 153 057 a process is described in which flour is continuously fermented in a 10% aqueous slurry with lactobacilli and optionally yeast. This slurry is then added to the cracker dough. The total process is described by D. Fox et al in Australian Journal of Biotechnology, 3(2) 139–43 1989. This process in practice requires the fermented flour slurry to be produced on the same location where the cracker dough is produced. Also, the continuous fermentation is difficult to adapt to required variations in production volume of the crackers Thus, all methods as described above have various disadvantages, mainly being long process times (fermentation and proofing) and a large number of process steps which makes processing complicated and involves extensive and complicated equipment. For example, a cracker manufacturer who wishes to operate the process using the prefermentation method instead of the more classical methods will need to invest in new, different and complicated equipment.

Hence, there is an need for an improved process for manufacturing dry bakery products such as rusk, crackers (including fermented and cream crackers, chemically leavened crackers, soda crackers, etc), dry biscuits and the like. Such process should involve fewer process steps, and/or lead to shorter and simplified processing and/or less investment in expensive machinery on the part of the cracker manufacturer. The process may also lead to dry baked goods with improved properties such as flavour, taste, texture or appearance.

SUMMARY OF THE INVENTION

It has now been found that dry baked goods can be produced, with a simple process for preparing the dough, which does not involve the use of diluted aqueous slurries of fermented flour and/or sponges by the manufacturer, by using a new bakery ingredient as hereinafter described.

The new bakery ingredient comprises fermented cereal germs, prepared by subjecting cereal germs to fermentation with lactic acid bacteria and optionally yeast. The fermentation may be carried out in solid state or in an aqueous medium. If carried out in an aqueous medium, the fermented cereal germs according to the invention are generally obtained as a wet slurry. This slurry can be used as such as a baking improver, but it may advantageously be concentrated by partial removal of water. Furthermore, by substantially complete removal of water it may be converted into a dry form, which has the additional benefit of improved storage stability and easy handling and shipping. Additionally, it is also possible to use liquid extracts of the fermented cereal germs which may in turn be converted to concentrated or a dry form. The bakery ingredient comprising the fermented cereal germs in any of the forms described above constitutes one aspect of the invention.

DESCRIPTION OF THE PREFERRED EMBODIMENT

The cereal germs may be derived from wheat, barley, rye, corn, rice and other edible cereals. Germs from wheat or barley are preferred, particularly wheat.

The fermentation for obtaining the fermented cereal germs is carried out using standard fermentation techniques, preferably using starter cultures comprising lactic acid producing bacteria. More preferred lactic acid bacteria are lactobacilli such as *Lactobacillus plantarum* or *Lactobacil-*

*lus brevis*. Yeast may be added to the starter cultures used, in particular *Saccharomyces cerevisiae*.

The fermentation of the cereal germs can be carried out using a level of solids of between 5 and 95% by weight, preferably between 5 and 40%, more preferably between 20–40%, and can be carried out in any hygienic fermentation vessel with provisions for good mixing and temperature control. The temperature is generally kept at 15–50° C., preferably 25–40° C. Prior to fermentation the fermentation mixture may be pasteurized or sterilized e.g. by using HTST equipment, whereafter the lactic acid producing bacteria and optionally the yeast are added to the mixture. The fermentation process is carried out for 15 minutes to 72 hours, preferably 8–72 hours, more preferably 30–72 hours, most preferably 48–72 hours, and the matrix may be pasteurized or sterilised again in order to inactivate viable organisms and/or enzymes.

Before or during the fermentation the cereal germs may be treated with various enzymes, preferably those having protease and/or carbohydrase (particularly amylase, amyloglucosidase, hemi-cellulase or cellulase) activity. Such treatment is preferably carried out simultaneously with the fermentation. The treatment leads to improved properties of the fermented cereal germs which in turn leads to improved processing of the dough as well as flavour/taste and odour of the cracker in which the bakery ingredient is used.

In addition to the cereal germs, the starter culture, and optionally the yeast and/or the enzymes, the fermentation mixtures may also include cereal (particularly wheat) flour and other ingredients such as salt, malt, sugars such as dextrose, sucrose or molasses, and proteins (particularly gluten) which may be (partly) chemically or enzymatically degraded.

The resulting fermentation broth can be processed in various ways, including stabilising/preserving the final product. Such processing may include chilling (e.g. to refrigerator temperatures), concentration by evaporation of water leading to a concentrated slurry or paste, or processing leading to a solid product such as deep freezing or drying (e.g. by use of spray-dryer, freeze dryer, ring-dryer, fluid-bed dryer or vacuum-band dryer equipment). If before such further processing solids are removed from the fermentation broth an extract is obtained which can be further processed as described above. Before or after drying the fermentation product may be combined with carrier materials (e.g. modified starch or maltodextrin) or with other dry ingredients commonly used for bakery applications, such as dry yeast, dry flour or dry sugars. The resulting mixture can be subjected to further drying if desired. The final dry product should preferably have a moisture content of 10% or less, more preferably below 6%. During or after fermentation of the cereal germs other parts of cereals (e.g. bran or endosperm) may also be added.

The bakery ingredient according to the invention may be used as a baking improver in the preparation of dry bakery products, particularly crackers. The term "baking improver" is herein to be understood to be a composition comprising at least one component which facilitates or improves the processing of dough or improves the properties of dough and/or of the bakery products prepared therefrom. Such improvements may be in: processing time, fermentation time, proofing time, dough rheology, dough handling, specific volume, dough stability, dough flexibility, dough tolerance, appearance of the bakery products prepared from the dough (e.g. colour), organoleptic properties of the bakery products (flavour, taste, odour), structure or texture of the bakery products, staling properties, shelf life, etc. The bakery ingredient according to the invention may be added as such to flour or dough or may be first combined with other bakery ingredients, including bakery ingredients which are known in the art as baking improvers according to the definition above, such as enzymes ($\alpha$-amylase, xylanase, glucose oxidase, peroxidase, etc.), emulsifiers (mono- and diglycerides), salts (e.g. NaCl and $NaHCO_3$), chemical oxidizers (e.g. ascorbic acid and $KBrO_3$) and proteins (particularly gluten) which may be (partly) chemically or enzymatically degraded.

Thus, a further aspect of the invention is a new process for the preparation of premium crackers in which the bakery ingredient according to the invention is incorporated in the dough prior to baking, whereafter the dough is further processed and baked as known in the art. The dough comprising the bakery ingredient according to the invention is another aspect of the invention. The preparation of the dough according to the invention can be carried out as a one-step process, in which all ingredients, including the bakery ingredient according to the invention, are mixed at the same time and the resulting dough processed in the usual way.

Figure 1:
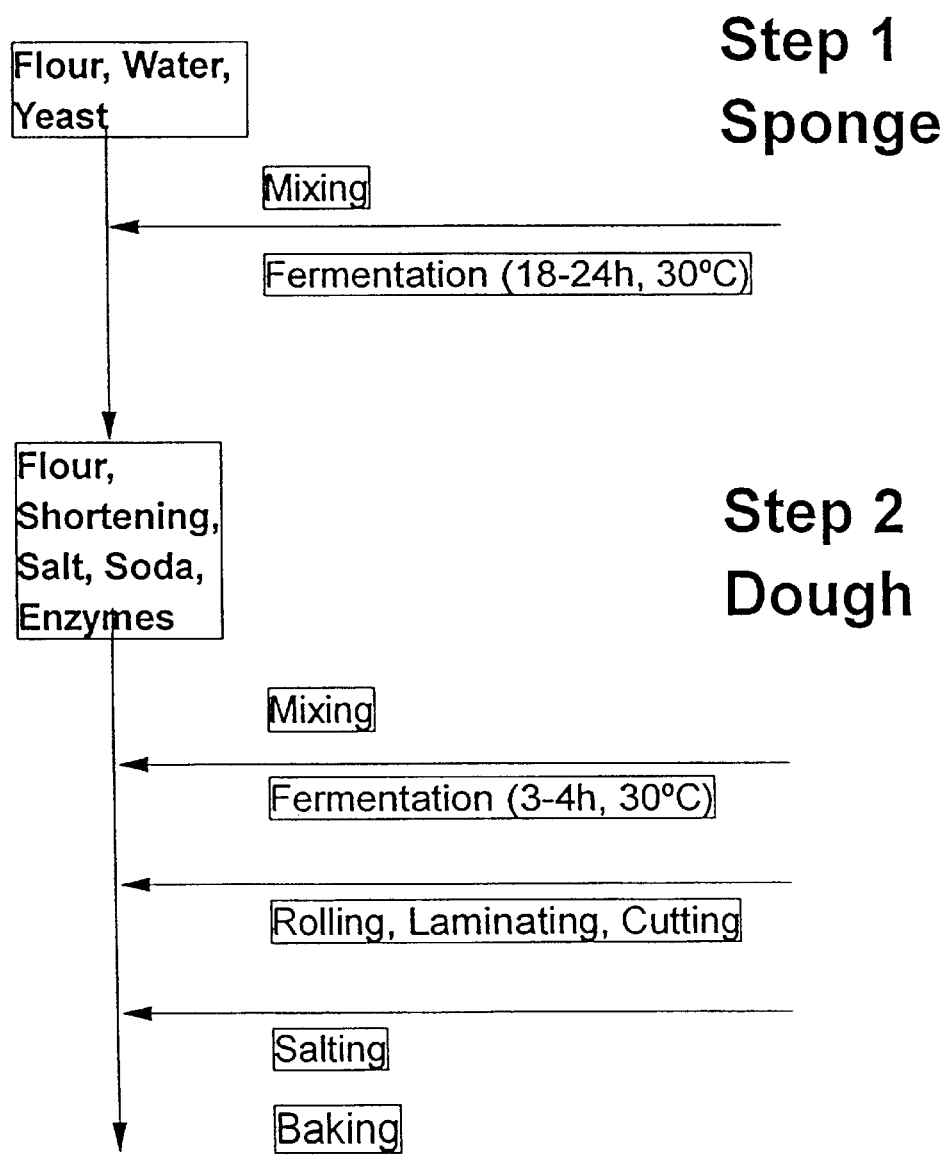
FIG. 1 schematically illustrates the conventional "Sponge and Dough" method for preparing crackers.
Figure 2:
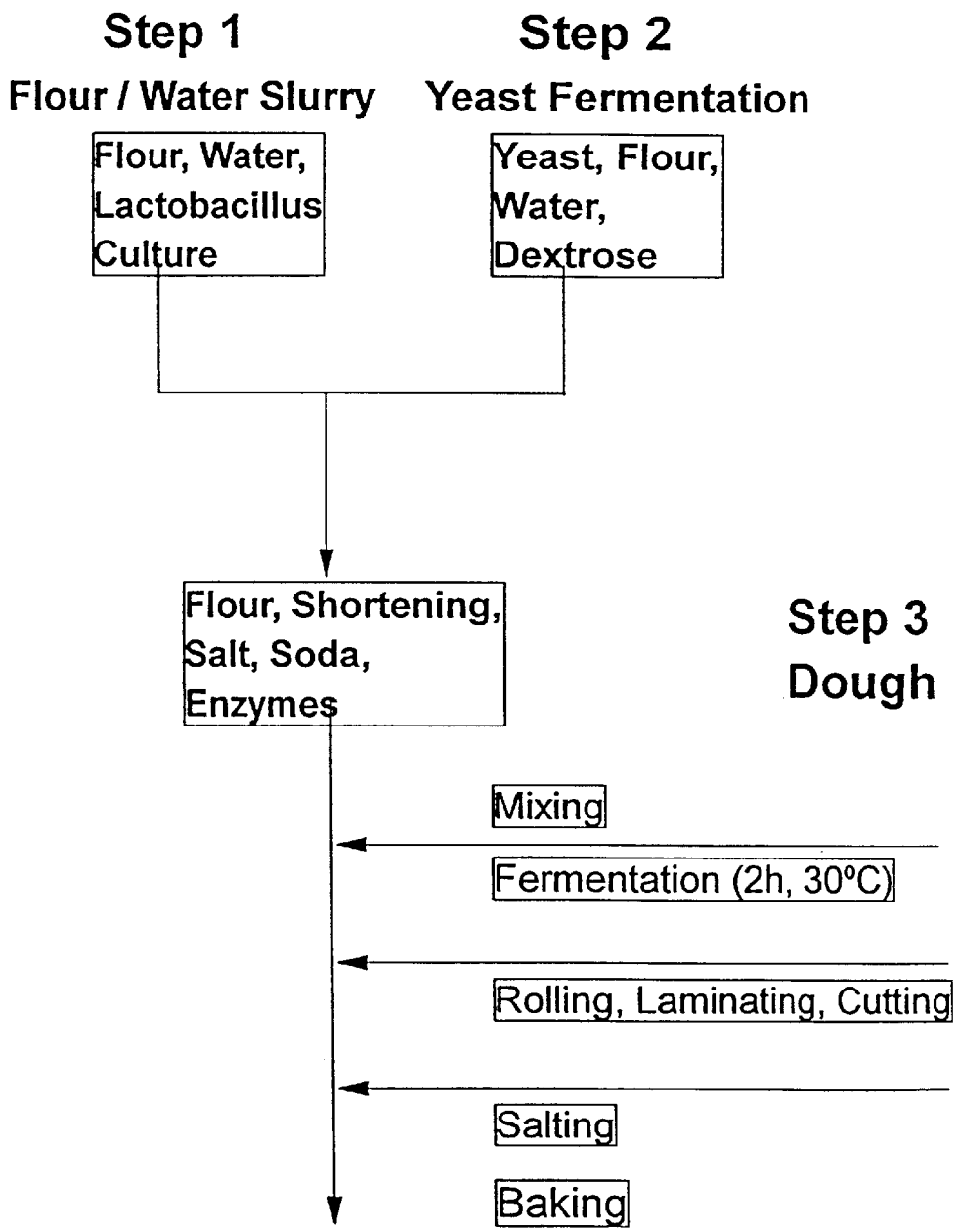
FIG. 2 schematically illustrates the continuous flour fermentation method for preparing crackers.
Figure 3:
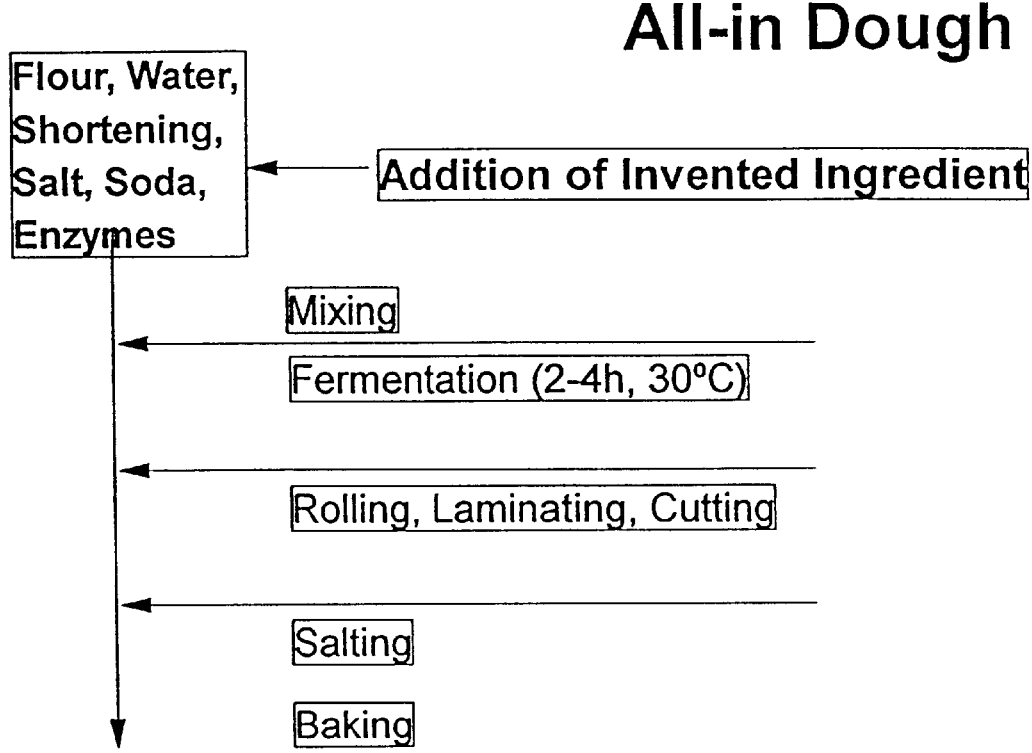
FIG. 3 schematically illustrates the process for preparing crackers according to the invention."

Therefore, an aspect of the invention is the use of the bakery ingredient prepared from fermented cereal germs as set out above, which permits shortening and simplifying of the cracker production process. This new process can best be compared with both the classical process as well as the starter culture based process as set out herein before, the major difference being that through the use of the bakery ingredient the first processing steps of both prior art processes can be avoided, thus resulting in a much shorter total processing time and avoidance of the use of large quantities of fermented slurries. The preparation and processing of the final dough stage is the only remaining step. In the new process a mixture is prepared from flour, water, yeast, sugar (and if desired additional ingredients such as prior art baking improvers as mentioned above, flavours, herbs etcetera). The new bakery ingredient is incorporated in this mixture, which can be done after mixing together the conventional ingredients, but this can also be done in any earlier stage by mixing the bakery ingredient with one or more of the conventional ingredients before incorporation in the bulk of the dough. After mixing all the dough ingredients, including the new bakery ingredient, the dough is preferably allowed to ferment for a few hours (0.5–8 hours, preferably 1–4 hours) at a moderate temperature (between 15 and 50° C., preferably between 25 and 35° C.). Following this, the dough is processed in conventional ways: rolling, laminating, cutting, and baking. An example of such a process is schematically given in FIG. 3. In addition, since the process requires only the extra addition of a single (low volume) ingredient, there are no technical requirements involved and thus no major capital cost implications for production procedures or maintenance. When the process according to the present invention is compared with the conventional methods of preparing premium crackers, it can be concluded that the total number of production operations can significantly be reduced from four to one step, and as a consequence the process for the preparation of the dough for crackers can be reduced from well over 20 hours for the conventional "sponge and dough" process to below 8 hours (or even below 4 hours) for the process according to the present invention. The bakery ingredient can be produced in a different location than the production of the dry bakery products and can in concentrated or dry form easily be shipped and stored and used as and when required.

In preparing the dough for dry cereal products such as premium crackers with the new bakery ingredient according to the invention the use of various other conventional baking improvers as mentioned above is recommended, such as enzyme preparations comprising α-amylase, protease and/or hemicellulase (e.g. xylanase), stabilizers, emulsifiers, hydrocolloids, dough relaxing compounds (such as proteinase or wheat gluten, which may be dried and/or modified by chemical, physical or enzymatical action).

The bakery ingredient according to the invention may be added to the dough in an amount so as to provide between 0.1 and 10%, preferably between 0.2 and 4% and more preferably between 0.5–2.5% by weight of fermented cereal germs in the dough, based on the total amount of flour. It may also be added directly to the flour in the amounts specified above, or to another ingredient for the dough in such an amount that in the dough the amount is within the limits specified above calculated on the amount of flour used.

As outlined above, the bakery ingredient according to the invention may be used in the manufacture of premium crackers (including fermented- and cream crackers) for processing reasons. However, the bakery ingredient may also contribute to flavour, taste, texture and appearance which is also applicable to other forms of dry bakery products, including chemically leavened crackers, soda crackers, etc.

The cereal germs used for the preparation of the bakery ingredient are a side-product obtained when preparing flour from cereal.

In table 1 below the new process is compared with both the conventional "sponge and dough" process as well as with the process according to EP 153 057 on a number of parameters.

TABLE 1 comparison of methods for the preparation of premium crackers.

| Issue | Sponge and Dough | Process according to EP 153057 | Process according to the invention |
| --- | --- | --- | --- |
| Capital investment requirements for sponge process | Significant | Very High | None |
| Management of sponge process | Yes | Yes | None |
| Labour costs for sponge process | High | Moderate | None |
| Working capital charge for sponge process | Moderate | High | None |
| Energy costs for sponge process | High | Reduced | None |

TABLE 1-continued comparison of methods for the preparation of premium crackers.

| Issue | Sponge and Dough | Process according to EP 153057 | Process according to the invention |
| --- | --- | --- | --- |
| Space requirement for sponge process | High | Reduced | None |
| Consequences of failure of sponge process | Considerable | Huge | Not relevant |
| Reproducibility of "sponge" product | Batch to batch variation | Variable | Specifiable |
| On-line control of sponge process | Required | Required | None required |
| Acid value of "sponge" product | On-line check | On-line check | Dose controllable |
| Failed sponge batches | Risk | Risk | None |
| Consequences of plant failure down the line | High | Moderate | Low |
| Recipe stability | Batch to batch adjustment | Continual adjustment | Minor adjustment |
| Process duration | Long | Medium | Short |
| New product development | Long development | Requires process development | Simple recipe variations |

As is immediately evident, the new process using the bakery ingredient according to the invention has many benefits for the preparation of premium crackers.

The invention is further exemplified by the following examples, but it is in no way limited thereto.

EXAMPLE 1

Preparation of the Bakery Ingredient

Fermentations for the production of the bakery ingredient were carried out on a 2 liter scale using double walled glass fermenters equipped with pH measurement/logging facilities using Ingold pH electrodes in combination with Consort R601 (Consort B. V., Antwerpen, Belgium) pH transmitters. During fermentation the temperature was maintained at 30° C. through the jacket using an external water circulation bath.

The fermenter was filled with 800 ml tap water and 300 grams of commercially available wheat germ flakes (Spillers). During filling the slurry was gently agitated at 50–100 rpm using a 10 cm diameter stirring blade in combination with a stirring motor. Fermentation was started, using the non-sterilised substrate, by the inoculation of 20 ml of a washed cell suspension ($10^9$ cfu/ml) of the homo fermentative lactic acid bacterium *Lactobacillus plantarum* NRRL B18 368 and 0.33 ml of each of the following enzyme preparations viz. protease L30 and α-amylase amylo 300 L35 (trade names of Quest International, Naarden).

The fermentation was stopped after 48 hours by in-situ pasteurisation of the whole broth (30 min at 80° C.), which was subsequently freeze dried in a Unitop 800 L Freeze Mobile 24 (The Virtis Company Inc., Gardiner, N.Y. 12525) laboratory freeze dryer using the following drying conditions: condenser temperature −60 to −80° C., product temperature −30° C., vacuum 10 Pa. Finally the freeze dried product was made into a fine powder using a Tefal, Quick Foodmaster horizontal knife mixer.

EXAMPLE 2

Preparation of the Bakery Ingredient

In a suitable double walled fermentor 10 l of a mixture consisting of 27% w/w of wheat germ flour (Roland Industries Inc, St Louis, Mo.), 72.9% w/w of tap water and 0.1% w/w of Promalt 295 (enzyme system having α-amylase, β-glucanase and protease activities*) is kept at a temperature of 55–60° C. for 30 minutes and thereafter at 85° C. for 30 minutes. The mixture was cooled to 35° C. and to it was added: 0.033% v/w of Amylo 300 (liquid amyloglucosidase preparation*), 0.033% v/w of Bioprotease FL (liquid fungal protease preaparation*) and 0.001% w/w of Sardo SC (frozen starter culture containing 45.109 vcc/ml. of *Lactobacillus plantarum**). Fermentation was continued for 48 hours during which the pH dropped to 3.5. The fermentation broth was pasteurized (30 minutes at 80° C.). 2.5% w/w of Paselli MD10 (maltodextrin marketed by Avebe, Veendam, The Netherlands) was added and the mixture was spray dried using an inlet air temp. of 180° C. and an outlet air temp of 90° C.

* trade names of Quest International, Naarden, The Netherlands.

The bakery ingredient was obtained as a slightly yellow coloured powdered product.

EXAMPLE 3

Application of the Bakery Ingredient in the Manufacture of Premium Crackers

Premium crackers were prepared using the conventional sponge and dough process, as well as the process according to the invention. The following recipes were adhered to:

| Recipes: | | | |
|---|---|---|---|
| Sponge and Dough | | Process according to the invention | |
| Sponge: | | All-in: | |
| 650 g | Wheat Flour | 1000 g | Wheat Flour |
| 310 g | Water | 320 g | Water |
| 4 g | Yeast (compressed) | 110 g | Shortening |
| | | 18 g | Salt |
| Dough: | | 4 g | Yeast |
| Sponge plus: | | 4.5 g | Soda |
| 350 g | Wheat Flour | 0.05 g | Biobake ® BSC* |
| 110 g | Shortening | 30 g | Fermented wheat germs (invented ingredient) |
| 18 g | Salt | | |
| 4.5 g | Soda | | |
| 0.05 g | Biobake ® BSC | | |

*A mixture of protease and α-Amylase marketed by Quest International, Naarden, the Netherlands.

Processing was Done Along the Following Lines

| | | Sponge & Dough process | Process according to the invention |
|---|---|---|---|
| Sponge: | Mixing time (min): | 5 | — |
| | Sponge temp. (° C.): | 30 | — |
| | Fermentation time (h): | 18 | — |
| Dough: | Mixing time (min): | 5 at speed I | 5 at speed I |
| | Dough temp. (° C.): | 30 | 30 |
| | Fermentation time (h): | 4 | 4 |
| Processing: | Layers: | 8 | 8 |
| | Dough height (mm): | 1.0–1.25 | 1.0–1.25 |
| | Dough weight per piece (g): | 4.5 | 4.5 |
| | Cutter dimension (mm): | 55 × 47 | 55 × 47 |
| Baking conditions: | Temperature (° C.): | 265 | 265 |
| | Baking time (min): | 4.5–5 | 4.5–5 |

The Following Equipment was Used

Mixer: Morton double-Z-mixer with 2 speeds and double jacked walls plus thermostat. Connected to the mixer was a recording device for measuring dough temperature and mixing energy.

Proofer: set on 26° C. and 75% relative humidity.

Sheeter: Seewer Rondo.

Oven: deck-oven, with adjustable top- and bottom heat.

The resulting crackers were tested and evaluated with the following result:

Evaluation of Crackers

| | Sponge and Dough | All-in produced Cracker |
|---|---|---|
| Apperance: | good, uniform | good, uniform |
| Bottom: | even | even |
| Structure, internal: | opened, even | opened, even |
| Height of 10 crackers (mm): | 53 | 54 |
| pH of final cracker: | 7.7 | 7.6 |
| Eating properties: | tender, crisp | tender, crisp |

What is claimed is:

1. A process for the preparation of dry crackers comprising:
   (a) providing a bakery ingredient prepared by fermentation of solid whole cereal germs by lactic acid bacteria,
   (b) forming a dough by mixing together flour, water, yeast, sugar, shortening and from 0.1 to 10% by weight, based on the flour, of said bakery ingredient and allowing said mixture to ferment for from 0.5 to 8 hours at 15–50° C.;
   (c) thereafter rolling, laminating and cutting said dough to form crackers; and
   (d) baking said crackers.

2. Process according to claim 1 wherein the crackers are premium crackers.

3. Process according to claim 1 wherein the bakery ingredient comprises fermented wheat germs.

4. Process according to claim 1 wherein the lactic acid bacteria are lactobacilli.

5. Process according to claim 4 wherein the lactobacilli are selected from the group consisting of *Lactobacillus plantarum* and *Lactobacillus brevis*.

6. Process according to claim 1 wherein the cereal germs were fermented in the presence of enzymes selected from the group consisting of enzymes having protease activity and enzymes having carbohydrase activity.

7. Process according to claim 1 wherein the bakery ingredient is concentrated by partial removal of water.

8. Process according to claim 1 wherein the bakery ingredient is in dry form.

9. Process according to claim 1 wherein the bakery ingredient is prepared by spray-drying.

10. Process according to claim 1 wherein the dough comprises an enzyme composition selected from the group consisting of enzyme compositions having α-amylase activity, enzyme compositions having (hemi-)cellulase activity and enzyme composition having protease activity.

11. Process according to claim 1 wherein the dough comprises gluten which is at least partly modified.

12. Process according to claim 1 wherein said cereal germs are fermented using a fermentation mixture containing at least 5 percent solids by weight.

13. Dry baked crackers obtained by the process of claim 1.

* * * * *